United States Patent
Kim et al.

(10) Patent No.: US 9,419,459 B2
(45) Date of Patent: Aug. 16, 2016

(54) ENERGY CONVERSION APPARATUS

(71) Applicant: Electronics & Telecommunications Research Institute, Daejeon (KR)

(72) Inventors: Sung Eun Kim, Daejeon (KR); Tae Wook Kang, Daejeon (KR); Kyung Hwan Park, Daejeon (KR); Sung Weon Kang, Daejeon (KR); Myung Ae Chung, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 310 days.

(21) Appl. No.: 14/101,792

(22) Filed: Dec. 10, 2013

(65) Prior Publication Data

US 2014/0159667 A1    Jun. 12, 2014

(30) Foreign Application Priority Data

Dec. 10, 2012  (KR) .................. 10-2012-0142962

(51) Int. Cl.
  *H02J 7/00*   (2006.01)
  *H02M 3/158*  (2006.01)
  *H02J 7/32*   (2006.01)
  *H02J 17/00*  (2006.01)

(52) U.S. Cl.
  CPC ............. *H02J 7/0068* (2013.01); *H02J 7/0065* (2013.01); *H02J 7/32* (2013.01); *H02J 17/00* (2013.01); *H02M 3/158* (2013.01)

(58) Field of Classification Search
  CPC ......... H02J 7/0065; H02J 7/0068; H02J 7/32; H02J 17/00; H02M 3/156; H02M 3/158; H01M 3/156; H01M 3/1582

USPC ......................................................... 320/128
See application file for complete search history.

(56) References Cited

U.S. PATENT DOCUMENTS

| 2007/0194759 | A1* | 8/2007 | Shimizu ............... H02J 7/0016 320/166 |
| 2009/0146493 | A1* | 6/2009 | Fujino ................ B60L 11/1887 307/9.1 |
| 2012/0078435 | A1* | 3/2012 | Huo .......................... H02J 3/14 700/297 |
| 2013/0119966 | A1* | 5/2013 | Touzani ............... B60L 11/005 323/312 |

FOREIGN PATENT DOCUMENTS

| KR | 10-2011-0127365 |   | 11/2011 |
| KR | 10-2012-0056456 |   | 6/2012 |
| KR | 20120056456     | * | 6/2012 |
| WO | WO2012013786    | * | 2/2012 |

* cited by examiner

*Primary Examiner* — Nathaniel Pelton
(74) *Attorney, Agent, or Firm* — Kile Park Reed & Houtteman PLLC

(57) ABSTRACT

Disclosed is an energy conversion apparatus. An energy conversion apparatus may comprise a control part controlling a length of a first time duration in which input current is inputted and accumulated, a length of a second time duration in which the accumulated current is provided to a load, and a length of a third time duration in which inverse current flows; and a DC-to-DC converter including an inductor, a output capacitor, and at least one switching element, wherein the input current is accumulated during the first time duration by switching the at least one switching element according to a control of the control part so as to perform input impedance matching, and the DC-to-DC convert provides a current corresponding to a difference between the accumulated current provided during the second time duration and the inverse current flowing from the output capacitor during the third time duration to the load.

6 Claims, 4 Drawing Sheets

ENERGY CONVERSION APPARATUS

CLAIM FOR PRIORITY

This application claims priorities to Korean Patent Application No. 10-2012-0142962 filed on Dec. 10, 2012 in the Korean Intellectual Property Office (KIPO), the entire contents of which are hereby incorporated by references.

BACKGROUND

1. Technical Field

Example embodiments of the present invention relate to a technology of converting energy, and more specifically to an energy conversion apparatus which can achieve high conversion efficiency with a simple configuration.

2. Related Art

A technology of energy harvesting is a technology for harvesting circumjacent energy thrown away, converting it to usable energy, and storing the usable energy for later use. The technology may enhance energy performance of electric devices and the like, and make it possible to drive electric devices by using circumjacent energy without any additional energy supplied.

As examples of energy harvesting technologies, there are a sunlight generation using sunlight, a thermoelectric generation using Zeeback effect according to differences of temperature, a Piezoelectric generation for obtaining electric energy from kinetic energy such as circumjacent vibration or shock, and a technology of converting motions of human body into electric energy.

An apparatus for energy harvesting may comprise an energy harvester harvesting circumjacent energy and an energy converter converting the energy provided from the energy harvester into electric energy having a consistent level.

Here, in the energy harvester, amount of energy to be generated and impedance condition may be varied persistently according to its operating condition. Therefore, the energy converter should perform impedance matching to the energy harvester to maximize energy delivered from the energy harvester, which is called a Maximum Power Point Tracking (MPPT).

For this, the conventional energy converter comprises two direct current to direct current (DC-to-DC) converters for impedance matching and output voltage stabilization. The first DC-to-DC converted is used for matching impedance to that of the energy harvester, and the second DC-to-DC converter is used for stabilizing output voltage.

As described above, since the conventional energy converter uses two DC-to-DC converters, there is a problem that a constitution of circuit for implementing the energy converter should be complicated and the size of the energy harvesting apparatus should increase. Also, since two DC-to-DC conversions are performed in a procedure of energy conversion, energy losses can be occurred two times so that there is a limit to enhance energy conversion efficiency.

SUMMARY

Accordingly, example embodiments of the present invention are provided to substantially obviate one or more problems due to limitations and disadvantages of the related art.

Example embodiments of the present invention provide an apparatus for converting energy, which can be implemented simply and can maximize efficiency of energy conversion.

In some example embodiments, an energy conversion apparatus may comprise a control part controlling a length of a first time duration in which input current is inputted and accumulated, a length of a second time duration in which the accumulated current is provided to a load, and a length of a third time duration in which inverse current flows; and a direct current to direct current (DC-to-DC) converter including an inductor, an output capacitor, and at least one switching element, wherein the input current is accumulated during the first time duration by switching the at least one switching element according to a control of the control part so as to perform input impedance matching, and the DC-to-DC convert provides a current corresponding to a difference between the accumulated current provided during the second time duration and the inverse current flowing from the output capacitor during the third time duration to the load.

Also, the control part may monitor the input current of the DC-to-DC converter, determine the length of the first time duration for impedance matching according to the input current, and determine the length of the second time duration and the length of the third time duration based on the determined length of the first time duration.

Also, the DC-to-DC converter may include a first switching element connected to between an input terminal and a first node; a second switching element connected to between the first node and a ground terminal; the inductor connected to between the first node and a second node; a third switching element connected to a node between the second node and the ground terminal; a fourth switching element connected to a node between the second node and an output terminal; and the output capacitor connected to a node between the output terminal and the ground terminal.

Here, the control part may control the first switching element and the third switching element to turn-on state during the first time duration in order for the input current to flow in the inductor.

Here, the control part may control the first switching element and the fourth switching element to turn-on state during the second time duration, and control the second switching element and the third switching element to turn-off state, in order for the accumulated current in the inductor to be provided to the load.

Here, the control part may control the first switching element and the third switching element to turn-off state during the third time duration, and controls the second switching element and the fourth switching element to turn-on state, in order for the inverse current to flow through the inductor and the second switching element.

Here, the energy conversion apparatus may further comprise a battery being charged by the inverse current flowing during the third time duration; and a power management part providing one of an output voltage corresponding to the current provided from the DC-to-DC converter and a voltage provided from the battery to the load.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
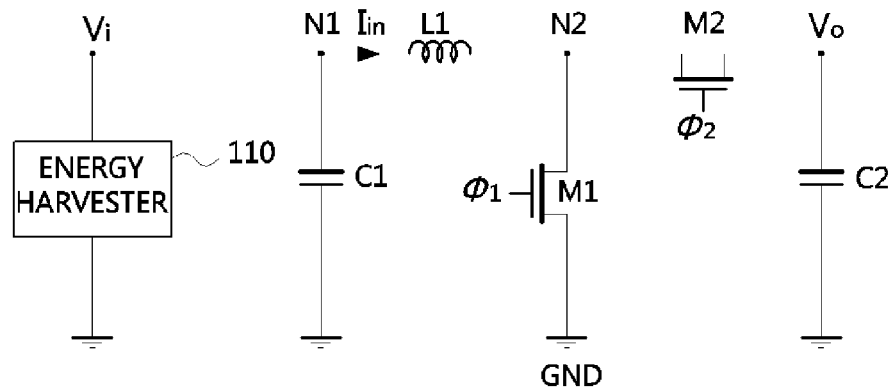
FIG. 1 is a circuit diagram to show a constitution of a boost-type DC-to-DC converter.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a circuit diagram to show a constitution of a boost-type DC-to-DC converter. Also, FIG. 2 is a timing diagram to show an operation of a boost-type DC-to-DC converter depicted in FIG. 1.

Figure 2:
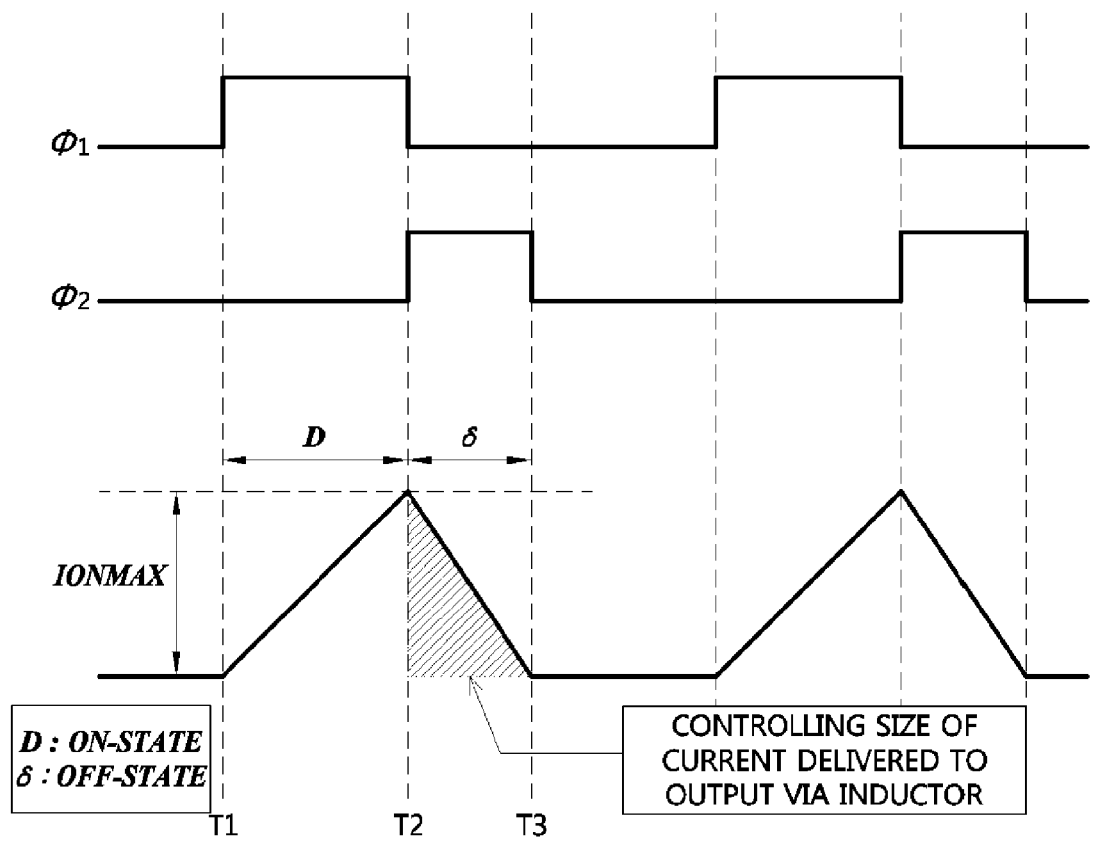
FIG. 2 is a timing diagram to show an operation of a boost-type DC-to-DC converter depicted in FIG. 1.

Referring to FIG. 1 and FIG. 2, a DC-to-DC converter may comprise a first capacitor C1 connected to a node between a first node N1 and a ground terminal GND, an inductor L1 connected to a node between the first node N1 and a second node N2, a first transistor M1 connected to a node between the second node N2 and the ground terminal GND, a second transistor M2 connected to a node between the second node N2 and an output terminal, and a second capacitor C2 connected to a node between the output terminal and the ground terminal GND.

An input terminal may be connected to an apparatus or a module (for example, an energy harvester 110) providing energy (input voltage, $V_i$) to the DC-to-DC converter, and the output terminal may be connected to an apparatus or a module using output voltage $V_o$ provided from the DC-to-DC converter.

Hereinafter, referring to FIG. 2, an operation of the DC-to-DC converter depicted in FIG. 1 will be explained.

First, a first clock signal ($\phi 1$) is transitioned from logic low to logic high at the time of $t_1$, and so the first transistor M1 changes to turn-on state. Accordingly, the input voltage ($V_i$) is applied to the DC-to-DC converter, and so an input current $I_{in}$ is provided to the inductor L1.

The current $I_{in}$ provided to the inductor L1 may increases during time duration D (on state) as time elapse, and may become a maximum value ($I_{onmax}$) at the time of $t_2$.

Then, the first clock signal ($\phi 1$) is transitioned from logic high to logic low, and a second clock signal ($\phi 2$) is transitioned from logic low to logic high at the time of $t_2$, and so the first transistor M1 changes to turn-off state, and the second transistor M2 changes to turn-on state. Accordingly, current flowing through the inductor L1 may be provided to the output terminal, and so the output voltage $V_o$ is provided to the output terminal.

The current flowing through the output terminal may flows during time duration $\delta$ (off state) from the time $t_2$ to the time $t_3$ decreases as time elapse, and becomes 0 at the time of $t_3$.

If current flowing through the inductor L1 becomes 0 at the time of $t_3$, the second clock signal ($\phi 2$) is transitioned from logic high to logic low in order to prevent inverse current from flowing. Since inverse current may generate a bad effect on efficiency of DC-to-DC converter, most of typical DC-to-DC converters are designed to prevent inverse current from flowing.

As shown in FIG. 1, even when a single DC-to-DC converter is used, impedance matching to the input terminal may be performed by controlling a length of logic high duration of the first clock signal (that is, time duration D for providing input current to the induction L1). However, in the case that operating condition of DC-to-DC converter changes for impedance matching, there can be a problem that the output voltage of DC-to-DC converter also changes, and so the output voltage becomes unstable.

In order to resolve the above described problem, an energy conversion apparatus, which can perform a function of maximum power point tracking (MPPT) and a function of stabilizing output voltage by using a single DC-to-DC converter, is provided.

Figure 3:
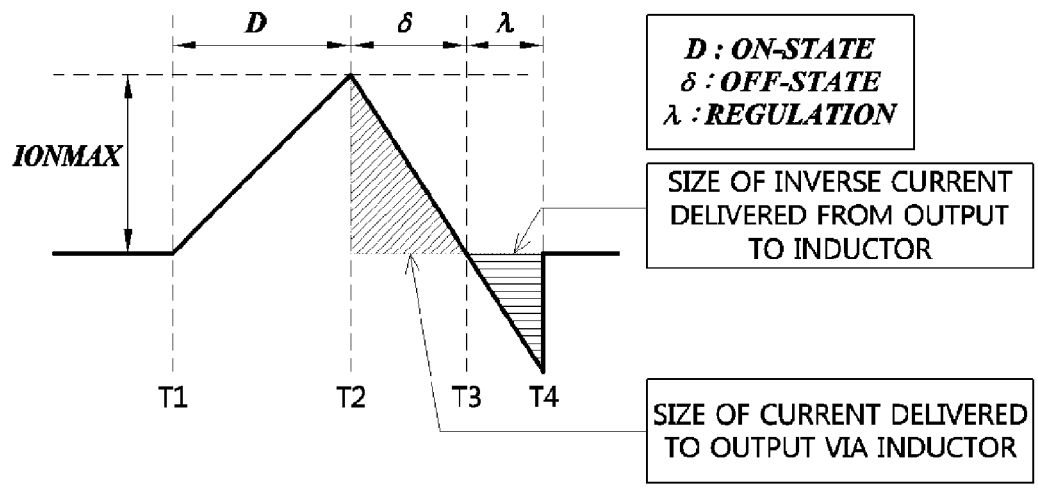
FIG. 3 is a conceptual diagram to explain an operation of an energy conversion apparatus according to an example of the present invention.

FIG. 3 is a conceptual diagram to explain an operation of an energy conversion apparatus according to an example of the present invention, and depicts current flowing through the inductor of DC-to-DC converter according to time lapse.

Referring to FIG. 3, during the time duration D from the time $t_1$ to the time $t_2$, currents flowing through the inductor increases, and it becomes maximized at the time of $t_2$. In an example of the present invention, impedance matching to the input terminal is performed by controlling a length of time duration D.

Then, during time duration $\delta$ from the time $t_2$ to the time $t_3$, current flowing through the inductor is provided to the output terminal, and so the size of the current decreases according to time lapse. Finally, the current becomes 0 at the time of $t_3$.

Meanwhile, during time duration $\lambda$ from the time $t_3$ to the time $t_4$, inverse current flows. After the time $t_4$, the inverse current is prevented from flowing.

In the energy conversion apparatus according to an example of the present invention, as shown in FIG. 3, the output voltage may be maintained to a desired value consistently by permitting the inverse current to flow during the time duration δ, controlling size of the inverse current, and controlling size of current provided to the output terminal. Also, in the present invention, the inverse current is used for charging battery so as to prevent energy from being lost.

Figure 4:
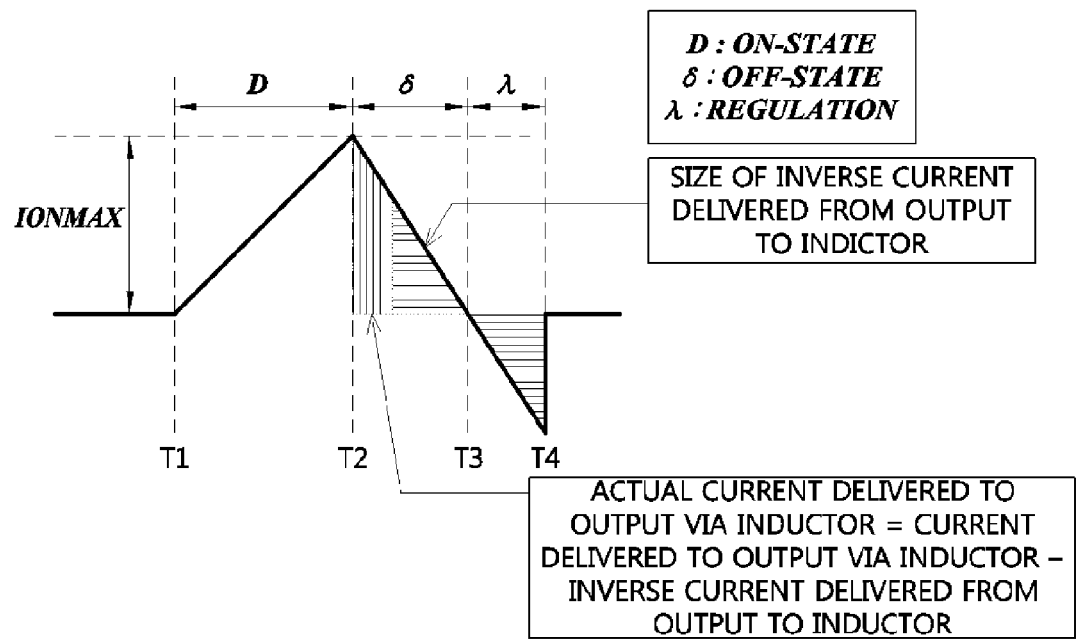
FIG. 4 is a conceptual diagram to explain a method of stabilizing output voltage performed in an energy conversion apparatus according to an example of the present invention.

FIG. 4 is a conceptual diagram to explain a method of stabilizing output voltage performed in an energy conversion apparatus according to an example embodiment of the present invention, and represents a method of controlling size of current flowing through the output terminal by controlling size of inverse current flowing from the inductor.

Referring to FIG. 4, a maximum value of current $I_{onmax}$ flowing through the inductor during the time duration D may be represented as below equation 1.

$$I_{onmax} = \frac{V_i DT}{L} \qquad \text{[Equation 1]}$$

In the equation 1, $V_i$ means input current provided to DC-to-DC converter, L means a value of inductance of the inductor. Also, T means unit of time.

Also, size of current flowing through the inductor during the time duration δ may be represented as below equation 2.

$$I_{offmax} = \frac{(V_o - V_i)\delta T}{L} \qquad \text{[Equation 2]}$$

In the equation 2, $V_o$ means the output voltage provided by DC-to-DC converter. If the equation 1 and the equation 2 are merged by using $I_{onmax}=I_{offmax}$, the length of time duration δ may be derived as below equation 3.

$$\delta = \frac{V_i D}{V_o - V_i} \qquad \text{[Equation 3]}$$

The equation 3 means that the length of time duration δ for generating desired output voltage may be obtained when the time duration D is determined and values of input voltage $V_i$ and desired output voltage $V_o$ are known.

Then, the time duration λ in which inverse current flows may be calculated based on the calculated time duration δ as below equation 4.

$$\lambda^2 = \left(\frac{V_i D}{V_o - V_i}\right)^2 - \left(\frac{V_i D}{V_o - V_i}\right)\left(\frac{2V_o}{R_L I_{onmax}}\right) \qquad \text{[Equation 4]}$$

In the equation 4, $R_L$ means a load resistance connected to DC-to-DC converter.

As explained above, the value of desired output voltage may be obtained by calculating the lengths of the time durations δ and λ, and operating the DC-to-DC converting according to the calculated lengths δ and λ.

That is, as shown in FIG. 4, actual amount of current delivered to the output through the inductor may be amount of inverse current delivered from the output to the inductor subtracted from amount of current delivered from the inductor to the output during the time duration δ. Therefore, a value of the output voltage may be maintained consistent by controlling the current.

On the other hand, input impedance of DC-to-DC converter may be calculated as below equation 5.

$$\frac{V_i}{I_{in}} = \frac{2L}{(DT + \delta T)DT} \qquad \text{[Equation 5]}$$

In the equation 5, $I_{in}$ means amount of current inputted to DC-to-DC converter.

As represented in the equation 5, the input impedance of DC-to-DC converter may be affected heavily by the length of time duration D.

Therefore, the input impedance may be determined by controlling the length of time duration D. If the input impedance is determined (or, the length of time duration D is determined), the length of time duration δ may be calculated, and the length of time duration λ in which inverse current flows may be calculated based on it. By applying the calculated lengths to DC-to-DC converter, input impedance matching and output voltage stabilization may be performed at the same time.

Meanwhile, inverse current generated by the energy conversion apparatus according to an example of the present invention may be used as a charging current for charging battery. When the energy harvest does not provide energy, energy charged in the battery may be provided to the load.

Figure 5:
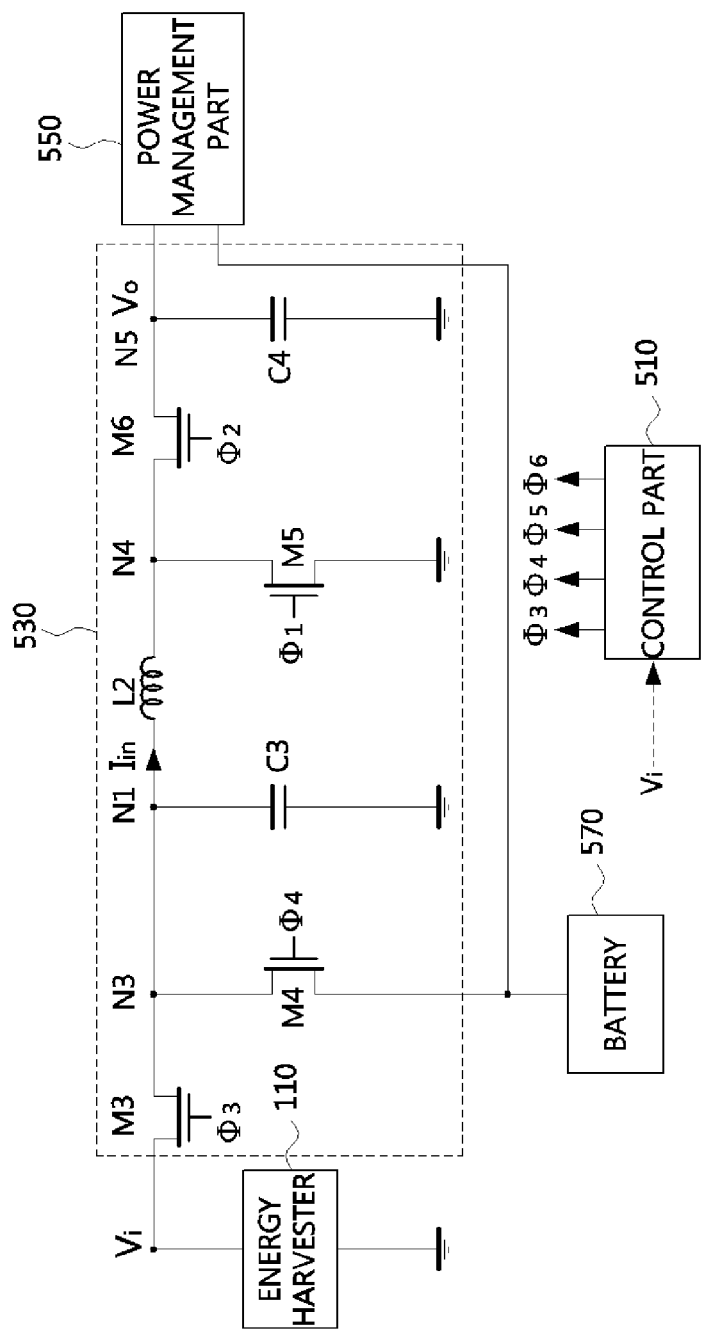
FIG. 5 is a circuit diagram to show a constitution of an energy conversion apparatus according to an example embodiment of the present invention.

FIG. 5 is a circuit diagram to show a constitution of an energy conversion apparatus according to an example embodiment of the present invention. Also, FIG. 6 is a timing diagram to represent an operation of an energy conversion apparatus depicted in FIG. 5.

Figure 6:
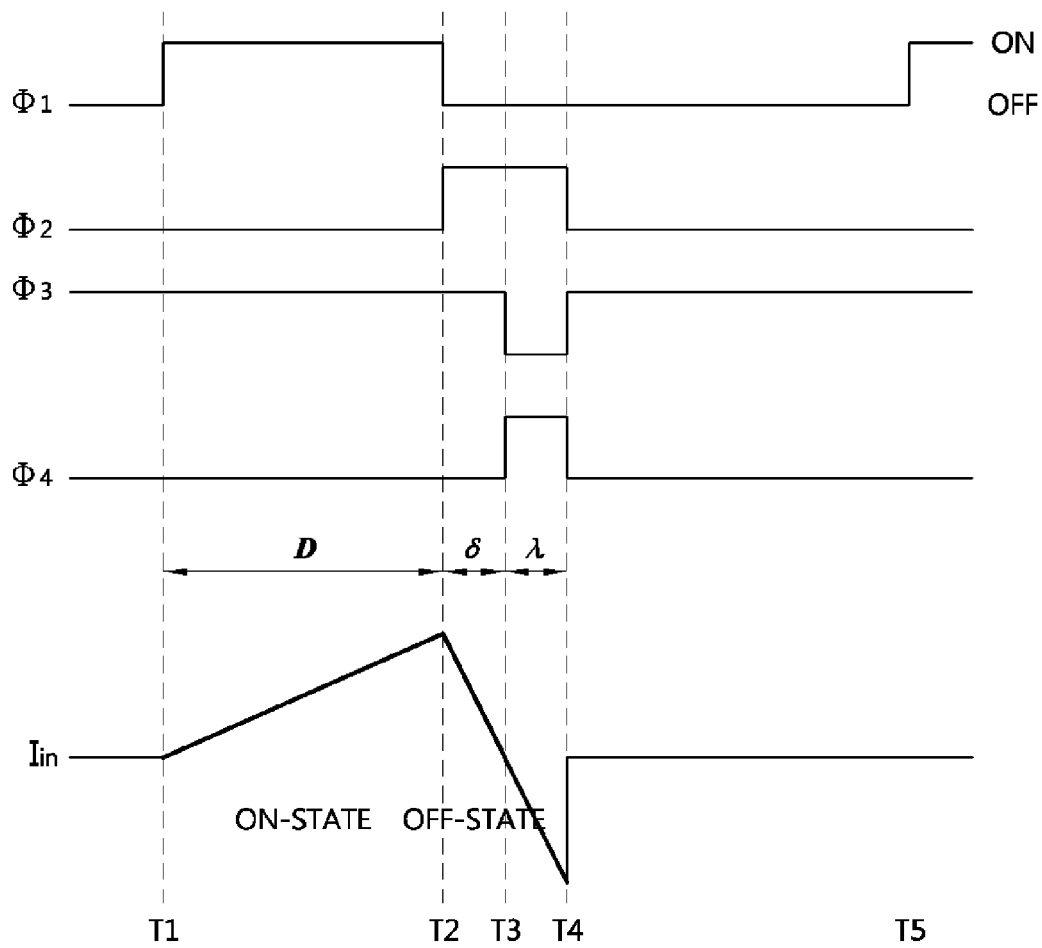
FIG. 6 is a timing diagram to represent an operation of an energy conversion apparatus depicted in FIG. 5.

Referring to FIG. 5 and FIG. 6, an energy conversion apparatus according to an example embodiment of the present invention may comprise a control part 510, a DC-to-DC converter 530, a power management part 550, and a battery 570.

The control part 510 may monitor input voltage $V_i$ to detect the input voltage $V_i$, determine a length of time duration D in which current flows through an inductor L2 for input impedance matching according to the input voltage $V_i$, obtain a length of time duration δ in which current of the inductor L2 is provided to an output terminal, and determine a length of time duration λ in which inverse current flows based on the length of time duration δ. Then, the control part 510 controls the DC-to-DC converter 530 to perform input impedance matching and output voltage stabilization by providing control signals φ1, φ2, φ03, and φ4 for controlling transistors M3, M4, M5, and M6 to the DC-to-DC converter 530 according to the determined lengths of time durations D, δ, and λ.

Here, the lengths of time durations D, δ, and λ may be configured as constant values in advance. In this case, the control part 510 may be configured to provide control signals φ1, φ2, φ3, and φ4 for controlling operation of the DC-to-DC converter 530 to the DC-to-DC converter 530 according to the preconfigured lengths of D, δ, and λ. Alternatively, after sets of the lengths of time durations D, δ, and λ according to changes of input voltage $V_i$ are configured in advance, the control part 510 may select a set of lengths in response to a change of input voltage $V_i$ and control the DC-to-DC converter based on the selected set of lengths of time durations.

The DC-to-DC converter 530 may perform impedance matching to input terminal providing input voltage $V_i$ and output voltage stabilization in response to the control part 510.

The DC-to-DC converter 530 may comprise a third transistor M3, a fourth transistor M4, a fifth transistor M5, a sixth transistor M6, a third capacitor C3, a fourth capacitor C4, and an inductor L2.

First, a configuration of the DC-to-DC converter 530 is explained in detail. The third transistor M3 may be connected to between an input terminal and a third node N3, and the fourth transistor M4 may be connected to between the third node N3 and the battery 570. Here, the input terminal is a terminal being provided with input current from an external apparatus or an external module. For example, voltage outputted from energy harvester 110 harvesting circumjacent energy may be provided to the input terminal as the input voltage $V_i$.

The third capacitor C3 may be connected to between the third node N3 and a ground terminal GND, and the inductor L2 may be connected to between the third node N3 and a fourth node N4.

The fifth transistor M5 may be connected to between the fourth node N4 and the ground terminal GND, and the sixth transistor M6 may be connected to between the fourth node N4 and a fifth node N5. Here, the fifth node N5 may become an output terminal proving output voltage $V_o$.

The fourth capacitor C4 may be connected to between the fifth node N5 and the ground terminal GND.

Hereinafter, an operation of an energy conversion apparatus will be explained in further detail, referring to FIG. 5 and FIG. 6.

For convenient explanation, the third to the sixth transistors M3, M4, M5, and M6 are supposed to be in turn-on state with logic level high, and supposed to be in turn-off state with logic level low. Of course, the above assumption is only for convenience of explanation, and the third to the sixth transistors M3, M4, M5, and M6 also can be configured to be in turn-off state with logic level high, and supposed to be in turn-on state with logic level low.

First, if the first signal φ1 and the third signal φ3 are transitioned to logic high, and the second signal φ2 and the fourth signal φ4 are transitioned to logic low at the time of $t_1$, the fifth transistor M5 and the third transistor M3 are transitioned to turn-on state, and the sixth transistor M6 and the fourth transistor M4 are transitioned to turn-off state. Then, current Iin provided to the input terminal is provided to the inductor L2, and so energy is accumulated in the inductor L2. Therefore, current flowing through the inductor L2 increases during the time duration D as time elapse.

Then, if the first signal φ1 is transitioned to logic low, and the second signal φ2 is transitioned to logic high at the time of $t_2$, the fifth transistor M5 is transitioned to turn-off state, and the sixth transistor M6 is transitioned to turn-on state. Therefore, current flowing through the inductor L2 is provided to the output terminal (that is, the fifth node N5) via the fourth capacitor C4.

In here, since a period that the first signal φ1 is transitioned from logic high to logic low makes a large effect on input impedance of DC-to-DC converter 530 as shown in FIG. 5, impedance matching can be achieved by controlling a time when the first signal φ1 is transitioned to logic high based on input voltage (or, input current) provided to the input terminal.

The size of current flowing through the inductor L2 starts decreasing from a time when the second signal φ2 is transitioned to logic high (that is, time $t_2$), and becomes a negative value from time $t_3$ after time duration δ elapses from the time $t_2$.

In the present invention, as described above, by controlling the third signal φ3 to be transitioned from logic high to logic low, and controlling the fourth signal φ4 to be transitioned to logic low to logic high at the time $t_3$, inverse current from the fourth capacitor C4 is made to flow through the sixth transistor M6, the inductor L2, and the fourth transistor M4 located in the side of the output terminal.

By controlling the inverse current to flow during the time duration .lamda. and maintaining the third control signal .phi.3 to be logic low while the inverse current flows, the inverse current is prevented from flowing to the energy harvester 110. At the same time, by maintaining the fourth control signal .phi.4 to be logic high for the fourth transistor M4 to maintain turn-on state, the inverse current is made to be inputted to the battery 570.

As explained above, an energy conversion apparatus according to an example embodiment of the present invention may perform impedance matching to the input terminal by controlling a length of time duration that the first signal φ1 maintains logic high, and controlling size of input impedance according to the length of time duration. Also, an energy conversion apparatus according to an example embodiment of the present invention may perform output voltage stabilization by controlling a length of time duration that inverse current flows in response to change of output voltage due to the control of input impedance in order to control amount of current provided to the output terminal.

The power management part 550 is connected to the output terminal of DC-to-DC converter 530 and the battery 570, and may selectively output the output voltage $V_o$ provided from the DC-to-DC converter 530 or voltage provided from the battery 570.

For example, the power management part 550 may be configured to provide the output voltage $V_o$ provided from the DC-to-DC converter 530 to a load when the output voltage $V_o$ is provided from the DC-to-DC. Otherwise, when the output voltage $V_o$ is not provided from the DC-to-DC, the power management part 550 may be configured to provide energy stored in the battery 570 to the load.

The battery 570 may be connected to the fourth transistor M4, and store energy according to provided inverse current. The battery 570 may provide the accumulated energy to the power management part 550 in response to the control of the power management part 550.

Although boost-type DC-to-DC converter is supposed to be used for an energy conversion apparatus depicted in FIG. 5 according to an example embodiment of the present invention, the technical thought of the present invention is not limited to the case of using the boost-type DC-to-DC converter. Therefore, other types of DC-to-DC converters such as a buck-type DC-to-DC converter may be also used for the energy conversion apparatus according to an example embodiment of the present invention.

According to the energy conversion apparatus as explained above, input impedance matching may be performed by a length of time duration that current flows through an inductor of DC-to-DC converter, and output voltage outputted from the DC-to-DC converter may be maintained to have a desired level consistently by controlling a length of time duration that inverse current flows.

Thus, input impedance matching and output voltage stabilization are performed at the same time by using a single DC-to-DC converter. Also, circuit implementation may be simplified and energy losses may be minimized by using a single DC-to-DC converter.

While the example embodiments of the present invention and their advantages have been described in detail, it should be understood that various changes, substitutions and alterations may be made herein without departing from the scope of the invention.

What is claimed is:

1. An energy conversion apparatus comprising:
   a control part controlling a length of a first time duration in which input current is inputted and accumulated, a length of a second time duration in which the accumulated current is provided to a load, and a length of a third time duration in which inverse current flows; and
   a direct current to direct current (DC-to-DC) converter including an inductor, an output capacitor, and at least one switching element,
   wherein the input current is accumulated during the first time duration by switching the at least one switching element according to a control of the control part so as to perform input impedance matching, and the DC-to-DC converter provides to the load an output current corresponding to a difference between the accumulated current provided during the second time duration and the inverse current flowing from the output capacitor during the third time duration,
   wherein the control part monitors the input current of the DC-to-DC converter, determines the length of the first time duration for impedance matching according to the input current, and determines the length of the second time duration and the length of the third time duration based on the determined length of the first time duration.

2. The energy conversion apparatus of the claim 1, wherein the DC-to-DC converter includes:
   a first switching element connected between an input terminal and a first node;
   a second switching element connected between the first node and a ground terminal;
   the inductor connected between the first node and a second node;
   a third switching element connected between the second node and the ground terminal;
   a fourth switching element connected between the second node and an output terminal; and
   the output capacitor connected between the output terminal and the ground terminal.

3. The energy conversion apparatus of the claim 2, wherein the control part controls the first switching element and the third switching element to turn-on state during the first time duration in order for the input current to flow in the inductor.

4. The energy conversion apparatus of the claim 2, wherein the control part controls the first switching element and the fourth switching element to turn-on state during the second time duration, and controls the second switching element and the third switching element to turn-off state, in order for the accumulated current in the inductor to be provided to the load.

5. The energy conversion apparatus of the claim 2, wherein the control part controls the first switching element and the third switching element to turn-off state during the third time duration, and controls the second switching element and the fourth switching element to turn-on state, in order for the inverse current to flow through the inductor and the second switching element.

6. The energy conversion apparatus of the claim 1, further comprising:
   a battery being charged by the inverse current flowing during the third time duration; and
   a power management part providing one of an output voltage corresponding to the current provided from the DC-to-DC converter and a voltage provided from the battery to the load.

* * * * *